(12) United States Patent
Huetter

(10) Patent No.: US 8,656,034 B2
(45) Date of Patent: Feb. 18, 2014

(54) NETWORK CONNECTION SWITCHING UNIT

(75) Inventor: Ingo Huetter, Pattensen (DE)

(73) Assignee: Thomson Licensing (FR)

( * ) Notice: Subject to any disclaimer, the term of this patent is extended or adjusted under 35 U.S.C. 154(b) by 596 days.

(21) Appl. No.: 11/662,168

(22) PCT Filed: Aug. 18, 2005

(86) PCT No.: PCT/EP2005/054082
§ 371 (c)(1),
(2), (4) Date: Mar. 7, 2007

(87) PCT Pub. No.: WO2006/027314
PCT Pub. Date: Mar. 16, 2006

(65) Prior Publication Data
US 2008/0034087 A1 Feb. 7, 2008

(30) Foreign Application Priority Data

Sep. 11, 2004 (DE) .......................... 10 2004 043 969

(51) Int. Cl.
*G06F 15/16* (2006.01)
*G05B 23/02* (2006.01)

(52) U.S. Cl.
USPC .............................. 709/229; 709/227; 340/3.4

(58) Field of Classification Search
USPC ........... 709/223–224, 227–229, 252; 340/3.1, 340/3.3–3.4
See application file for complete search history.

(56) References Cited

U.S. PATENT DOCUMENTS

| | | | |
|---|---|---|---|
| 6,182,171 | B1 | 1/2001 | Akatsuka et al. |
| 6,999,459 | B1 * | 2/2006 | Callon et al. ................. 370/400 |

(Continued)

FOREIGN PATENT DOCUMENTS

| | | |
|---|---|---|
| DE | 19961644 | 6/2001 |
| DE | 10250102 | 7/2004 |

(Continued)

OTHER PUBLICATIONS

Linksys Products. "EtherFast® Cable/DSL Router with 4-Port Switch." [Retreived from the Internet on Jun. 6, 2009} Copyright 2003. <URL: http://www-id.linksys.com/servlet/Satellite?c=L_Product_C2&childpagename=ID%2FLayout
&cid=1139845427262
&pagename=Linksys%2FCommon%2FVisitorWrapper
&lid=2726284869B02>.*

(Continued)

*Primary Examiner* — Larry Donaghue
*Assistant Examiner* — James Baron
(74) *Attorney, Agent, or Firm* — Tutunjian & Bitetto, P.C.

(57) ABSTRACT

The invention relates to the field of data transmission in a network of distributed stations. In this case, the network contains a network connection switching unit which sets up desired connections between network subscriber stations arranged in a star formation. The network system under consideration has provision for network stations to log on in the network using a logon message and to log off using a logoff message. Regular turn-on and turn-off operations allow these logon and logoff messages to be sent. One problem is that when the network cable for a network station is manually decoupled from the network connection switching unit (11) the decoupled network station is no longer able to transmit the proper logoff message. The invention solves the problem through additional means in the network connection switching unit. These detect the decoupling of a network station. The detection means then initiate the automatic sending of the proper logoff message by the network connection switching unit. To this end, the network connection switching unit records all information about the individual network stations which is required for generating a proper logoff message.

5 Claims, 3 Drawing Sheets

(56) References Cited

U.S. PATENT DOCUMENTS

Figure 1:
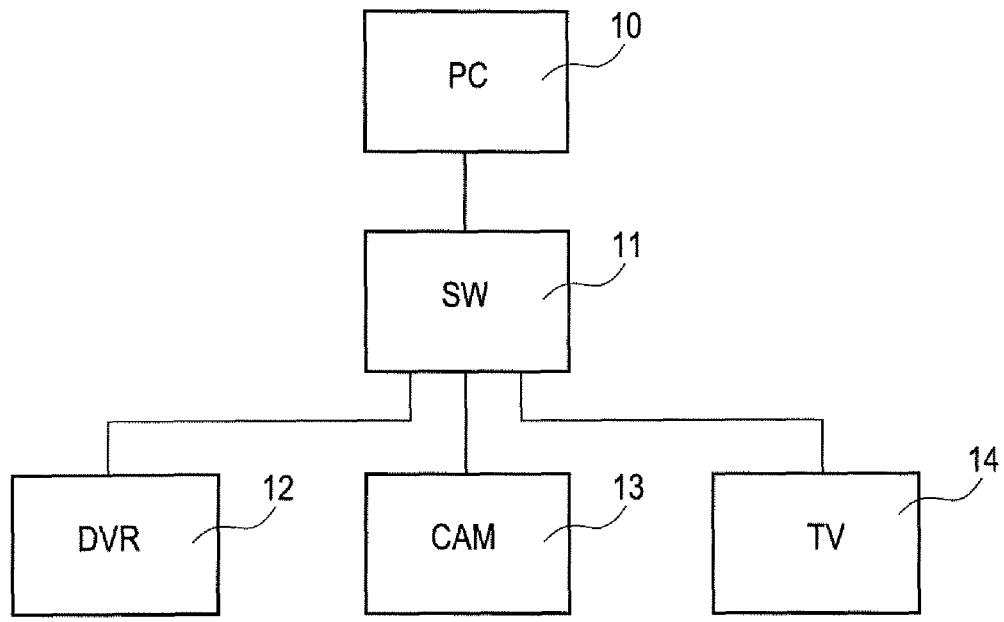

| | | | |
|---|---|---|---|
| 7,752,289 B2 | 7/2010 | Kikkawa et al. | |
| 8,233,475 B2* | 7/2012 | Ajero et al. | 370/352 |
| 8,346,947 B2* | 1/2013 | Ajero et al. | 709/228 |
| 2002/0027569 A1 | 3/2002 | Manni et al. | |
| 2002/0078161 A1* | 6/2002 | Cheng | 709/208 |
| 2002/0194371 A1 | 12/2002 | Kadoi | |
| 2003/0009581 A1 | 1/2003 | Herfet et al. | |
| 2003/0084100 A1* | 5/2003 | Gahan et al. | 709/203 |
| 2004/0083262 A1* | 4/2004 | Trantow | 709/203 |
| 2004/0083303 A1 | 4/2004 | Hwang | |
| 2005/0286427 A1 | 12/2005 | Hütter | |
| 2006/0002320 A1* | 1/2006 | Costa-Requena et al. | 370/312 |
| 2006/0209705 A1* | 9/2006 | Sauter et al. | 370/252 |
| 2007/0064918 A1* | 3/2007 | Son | 379/355.01 |
| 2008/0288580 A1* | 11/2008 | Wang et al. | 709/203 |

FOREIGN PATENT DOCUMENTS

| | | |
|---|---|---|
| WO | WO02054697 | 7/2002 |
| WO | WO03003658 | 1/2003 |
| WO | WO 03/079610 | 9/2003 |
| WO | WO2004073227 | 8/2004 |

OTHER PUBLICATIONS

Microsoft: "Universal Plug and Play Device Architecture, UPnP, Version 1.0", UPNP Specification, Jun. 8, 2000, pp. 1-86, submitted by the Applicant in the IDS filed on Mar. 27, 2007.*
Altotec: "Simple UPNP Proxy Protocol (SUPP) Architecture version 0.91", UPnP Specification, Feb. 4, 2002, pp. 1-57.
"Universal Serial Bus Specification Revision 2.0: Chapter 4, architectural overview", Universal Serial Bus Specification, Apr. 27, 2000, pp. 15-24.
Microsoft: "Universal Plug and Play Device Architecture, UPnP, Version 1.0", UPnP Specification, Jun. 8, 2000, pp. 1-86.
Yaron Y. Goland et al.: "Simple Service Discovry Protocol/1.0", IETF Standard-Working-Draft, Internet Engineering Task Force, IETF, CH, No. 2, Jun. 21, 1999.
Search Report Dated Nov. 17, 2005.
Shintani, A Design of a Home Server With Remote Monitoring and Developing of its Prototype, 2002, vol. 2002 No. 118, p. 55-60.
Shintani, "A Design of a Home Server With Remote Monitoring and Developing of Its Prototype", 2002, vol. 2002 No. 118, p. 55-60. (English translation of previously cited reference submitted on Aug. 16, 2011).

* cited by examiner

NETWORK CONNECTION SWITCHING UNIT

This application claims the benefit, under 35 U.S.C. §365 of International Application PCT/EP2005/054082, filed Aug. 18, 2005, which was published in accordance with PCT Article 21(2) on Mar. 16, 2006 in English and which claims the benefit of German patent application No. 102004043969.9, filed Sep. 11, 2004.

The invention relates to the technical field of data transmission in a network of distributed stations, particularly in a "home network".

In particular, the invention relates to a network connection switching unit which sets up desired connections between network subscriber stations arranged in a star formation.

BACKGROUND TO THE INVENTION

Various home network standards are available for networking devices in the home sector.

A consortium of companies, particularly the companies in the computer industry, led by Microsoft, have started an initiative for specifying a piece of network control software based on the existing Internet protocol (IP). This network system has become known by the acronym UPnP (Universal Plug and Play). In this system, the specification is not made primarily for consumer electronic devices, but rather other devices may also be integrated in the network, particularly personal computers, white goods, household appliances such as refrigerators, microwave ovens, washing machines, or else heating controllers, lighting controllers, alarm systems, etc. The transmission system which is preferably used for implementing a UPnP network is based on the known Ethernet bus system. Many variants of this bus system have been standardized, so that in the home network sector it is possible to select the respective optimum variant.

In the home network sector, it is recommended that "star cabling" based on two-wire copper cable be used. By way of example, the standardized 100-Mbit/s variant called 100Base-TX can be used, which uses a "CAT/5 cable", which can have a maximum length of 100 m. In the case of a star cabling, the cables are routed together to the individual network stations in a network connection switching unit, also called a "switch" or "hub". Such a network connection switching unit is able to convey data packets between the individual subscriber stations. It thus has its own control logic and the software required for this purpose.

The UPnP network system contains a stipulation that new stations need to log on in the network and disconnected stations need to log off from the network. This is done using special messages, which will be discussed in more detail later.

INVENTION

In the network scenario presented, there is the problem that if a network station is not disconnected in regular fashion, but rather is simply unplugged from the network manually, then the network station disappearing from the network in this manner is no longer able to send the correct logoff message. This results in inconsistencies. The network manages network devices as still existing, even though they are no longer present in the network. This can result in the other network stations continuing to attempt to communicate with the missing network station, which can result in unnecessary data transmission attempts in the network. These attempts are not aborted until after a "time out" has expired; this means that the sending device is blocked during this time.

For the outlined problem, the invention proposes a solution which is based on extending the design of the central network connection switching unit. The general idea of the invention is for the network connection switching unit to contain means which detect whether a network station is being unplugged from the network, and in this case for the proper logoff message for the network station which is then missing to be distributed to the other network stations.

This solution is claimed in the independent Claim 1. To be able to send the proper logoff message, it is advantageous if the network connection switching unit contains evaluation means which evaluate and record the logon and logoff messages sent by the directly connected devices, so that if manual unplugging of a network station is identified, it is possible to resort to the recorded information and to generate the proper logoff message.

The measures cited in the dependent claims permit advantageous developments and improvements to the inventive apparatus.

DRAWINGS

Figure 2:
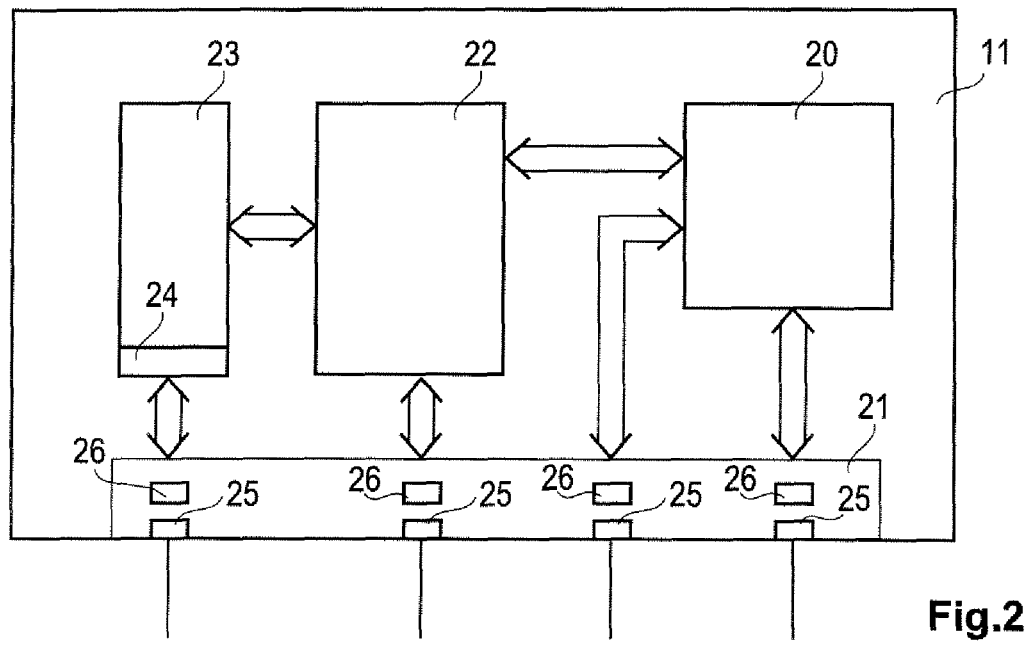
Figure 3:
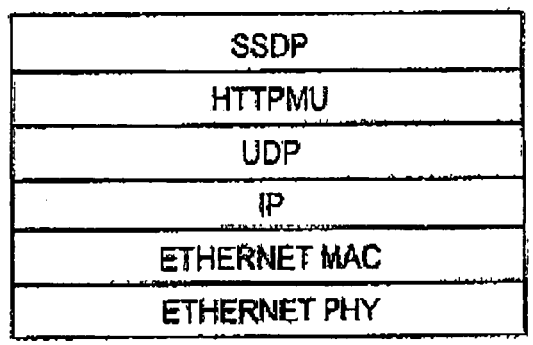
Figure 4:
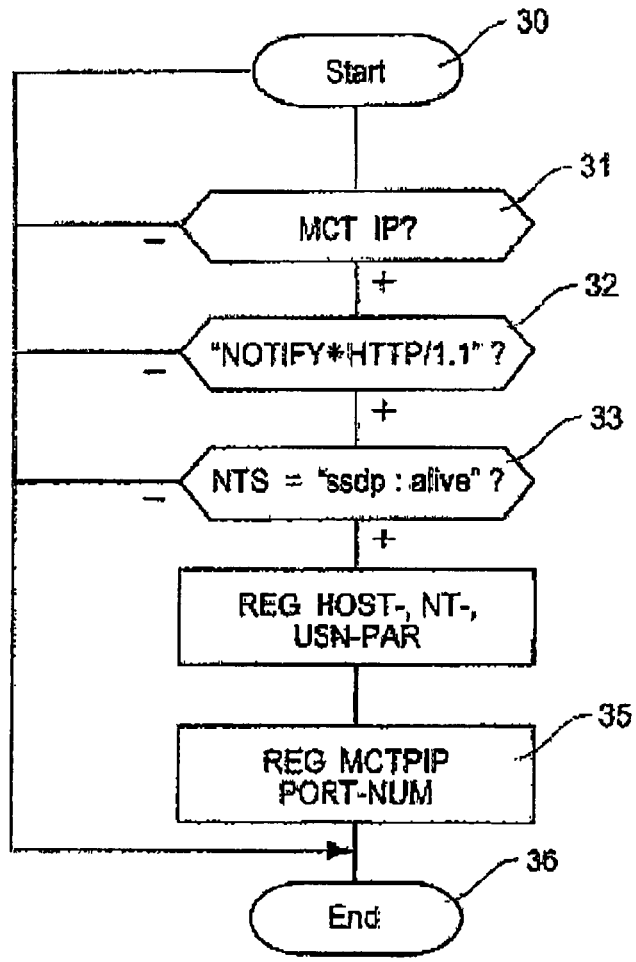
Figure 5:
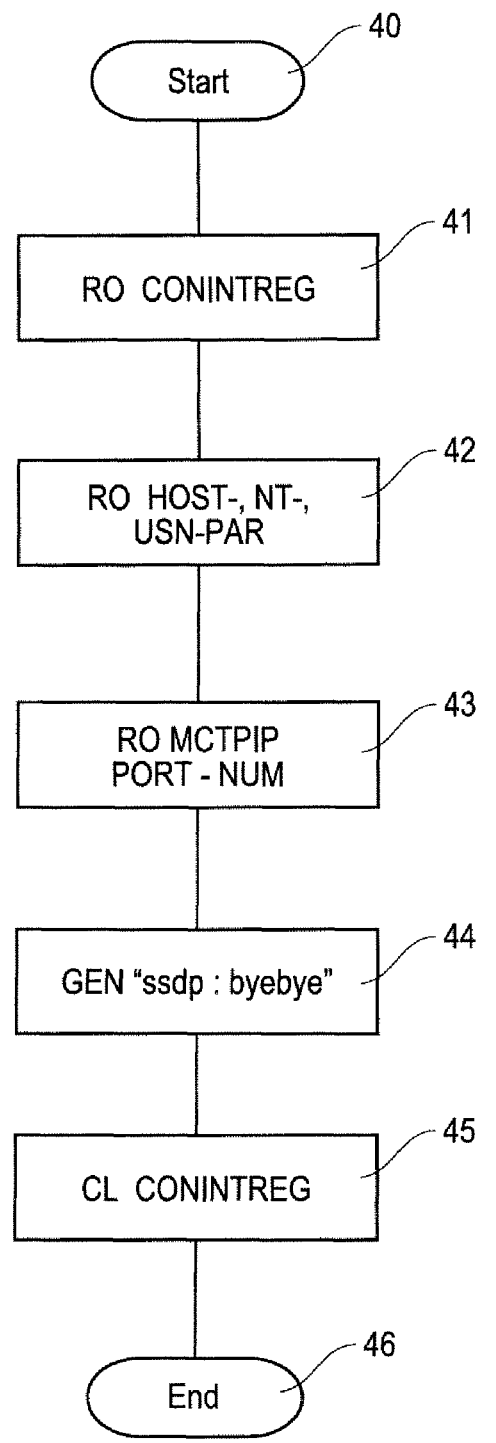

Exemplary embodiments of the invention are illustrated in the drawings and are explained in more detail in the description below. In the drawings:

FIG. 1: shows the structure of a star-shaped network having a central network connection switching unit;

FIG. 2: shows a block diagram of the inventive network connection switching unit;

FIG. 3: shows the protocol architecture of a network connection switching unit based on the invention;

FIG. 4: shows a flowchart for a program which can be used to evaluate logon messages; and FIG. 5: shows a flowchart for a breaking program which generates the proper logoff message when manual decoupling of a network station has been identified.

DESCRIPTION OF THE INVENTION

FIG. 1 shows a star-shaped home network having four network stations. In the centre, the central network connection switching unit 11 is shown. This network connection switching unit has four different UPnP devices connected to it via four network connection points 25 (also called "ports"). The reference numeral 10 denotes a personal computer, the reference numeral 12 denotes a digital video recorder, the reference numeral 13 denotes a camcorder and the reference numeral 14 denotes a TV set. From the network connection switching unit 11, the connecting lines emerge in star formation to the individual network stations. The transmission system used for the data transmission in the network is the aforementioned 100Base-TX variant of the Ethernet bus system. For the chosen instance of application, this variant was considered adequate, but in other instances of application, another variant may be used as transmission system. If even higher data rates are involved, the "1000Base-T" or "1000Base-SX" or "1000Base-LX" are available, for example. The last two variants are in this case based on optical glass fibre technology. For applications outside the home network sector, it would even be possible to use variants with a maximum data transmission rate of 10 Gbit/s. These are the "10Base" variants such as 10GBase-LX4.

The Ethernet bus system does not provide a secure connection for the higher protocol layers, since transmission frames can be lost. This is not satisfactory for transmitting large volumes of useful 5 data, which is why the transmission can often be protected by the higher protocol layers. For the UPnP network system, the next highest protocol level is the IP protocol (Internet Protocol) at the level of the network layer of the OSI layer model for data 10 communication. The data link layer is first provided by the TCP protocol (Transmission Control Protocol) based thereon. For both protocol levels, which are no longer part of the Ethernet standard, dedicated standardizations apply, with reference merely being made to these for the disclosure of the invention. The full protocol architecture stipulated in the UPnP network system can be found in the UPnP specification (available from internet address: upnp.org).

The text below gives a more detailed discussion of the design of the inventive network connection switching unit 11. The reference numeral 20 denotes the switching matrix of the network connection switching unit 11. The switching matrix 20 can be used as switching means to set up arbitrary connections between the network stations connected via the network connection points 25. To control the switching matrix 20, a microcontroller 22 in the network connection switching unit 11 acting as evaluation means is used. This microcontroller also performs other tasks in the network connection switching unit which acts as recording means, a more detailed discussion of which is given below.

The interface circuit 21 contains the circuit components which are relevant to the Ethernet protocol. The reference numeral 23 denotes a memory unit or a memory area in such a memory unit. This memory is also used to record the information for the logon messages which are to be evaluated in line with the invention. The reference numeral 24 also denotes a special register within this memory area, said special register being linked directly to detection means 26 provided in the interface circuit 21 which detect whether a network connection has been released manually. To detect such coupling or decoupling events, a plurality of solutions are known from the prior art. Reference is made particularly to the corresponding detection means which are used for the serial bus standard USB (Universal Serial Bus). Similar detection means are also known for the bus system IEEE-1394 and for the bus system HDMI (High Definition Multimedia Bus). Put in simple terms, in these detection means, pulling out a network connector opens or closes particular contacts, which results in associated storage flipflops being set or reset. In the case of the inventive solution with the special register 24, which is situated in the memory area 23, the flipflop outputs are applied directly to the register, which can then be read and evaluated as appropriate by the microcontroller 22.

Suitable network connection points are the usual plug connectors for receiving the known RJ45 connectors.

FIG. 3 shows the special protocol architecture which is required for a network connection switching device based on the invention. The two Ethernet protocol levels Ethernet PHY and Ethernet MAC are arranged on the bottom levels. Above these is the aforementioned protocol level IP. At the level of the transport layer, the UDP protocol (User Datagram Protocol) is then arranged, which likewise does not support secure data transmission. Instead, this protocol is superior to the secure TCP protocol (Transmission Control Protocol) in terms of speed.

Above this, there is a special version of the HTTP protocol (Hypertext Transfer Protocol). This is the HTTPMU protocol (HTTP Multicast over UDP). The HTTP messages are thus forwarded via the bottom UDP and IP protocol levels using inclusive addressing.

Above the HTTPMU protocol level, there is also the SSDP protocol (Simple Service Discovery Protocol). The two top protocol levels SSDP and HTTPMU do not need to be implemented fully for the inventive solution in this case. In accordance with the inventive solution, the network connection switching unit need only evaluate the "UPnP Notify" messages in order to implement the invention. These are the messages for which the network connection switching unit needs to search in the outgoing packets in order to establish whether a UPnP device is involved. Such a UPnP Notify message based on UPnP specification has the following appearance:

NOTIFY * HTTP/1.1
HOST: 239.255.255.250:1900
CACHE-CONTROL: max-age=seconds until advertisement expires
LOCATION: URL for UPnP description for root device
NT: search target
NTS: ssdp:alive
SERVER: OS/version UPnP/1.0 product/version
USN: advertisement UUID As mentioned, this is an "SSDP" message which is sent as a UDP packet on the basis of the HTTPMU standard. In the example given above, only the general structure of such a Notify message is shown. The parts of this message which are shown in italics need to be replaced with specific values in a real UPnP network. As an example, a detailed UPnP Notify message could then have the following appearance:

NOTIFY * HTTP/1.1
HOST: 239.255.255.250:1900
CACHE-CONTROL: max-age=1800
LOCATION: http://141.11.22.33/description.xml
NT: upnp:rootdevice
NTS: ssdp:alive
SERVER: Sample OS/1.0 UPnP/1.0 test/1.0
USN: uuid:b0edf480-a246-1026-a884-c4201044470c::upnp:rootdevice It should also be mentioned that the key information can be found after the parts in bold print in the general message format. These are firstly the key word "Notify", and secondly the parameters NT and NTS. The UPnP specification contains similar messages for other submodules too. In the case of these, the parameter statement after the parameter NT: is then different, however. The module which is significant to the invention corresponds to the entry "Root Device", as shown above for the exemplary logon message. If the associated UPnP device is unplugged from the network manually, the appropriate logoff message for this device needs to be generated by the network connection switching unit 11. The corresponding logoff message based on UPnP specification has the following general format:

NOTIFY * HTTP/1.1
HOST: 239.255.255.250:1900
NT: search target
NTS: ssdp:byebye
USN: uuid:advertisement UUID For the specific exemplary case, to generate the logoff message properly, the network connection switching unit would thus need to generate a packet with the entry "UPnP: route device" entered after the parameter NT: and with the parameter USN: being followed by the entered value which the device used when sending the Notify packet, that is to say the logon message. Accordingly, the correct logoff message for this example has the following appearance:

NOTIFY * HTTP/1.1
HOST: 239.255.255.250:1900
NT: upnp:rootdevice
NTS: ssdp:byebye USN: uuid:b0edf480-a246-1026-a884-c4201044470c::
upnp:rootdevice FIG. 4 shows an example of a program for evaluating the logon messages in the network from the central network connection switching unit 11 in the form of a flowchart. The evaluation of such logon messages is a comparatively simple matter, because the core of the relevant UPnP message comprises simple ASCII text which is arranged in the basic format of header and further lines of information, comprising a codeword, a colon and the subsequent value.

The start of the program is denoted by the reference line 30 in FIG. 4. In the subsequent test 31, a check is performed to determine whether the received packet was sent using the "multicast transmission mode". This can be established from the target IP address in the "header" of the received packet. The exemplary Notify*HTTP/1.1 message listed above indicates the standard multicast address 239.255.255.250 and the standard port 1900. If multicast transmission was not used, the evaluation of the data packet is terminated by step 36. If the data packet was actually transmitted in multicast mode, the test 32 checks whether the subsequent part of the data packet contains the line "Notify*HTTP/1.1" as a further "header line". If this is not the case, the program is again terminated by program step 36. If the outcome of the test is positive, all subsequent lines in the data packet are extracted up to the point at which there is a blank line. The extracted lines are then evaluated as illustrated. First, test 33 checks whether the parameter NTS is followed by the entry "ssdp:alive". If this is not the case, the program is again terminated by program step 36. If it is the case, the respective value for the parameters "HOST", "NT" and "USN" is recorded in the associated memory area 23. In addition, in program step 35, the multicast IP address and the network connection point 25 (port No) which was used to receive the data packet for analysis are also entered into the internal memory area 23. The program is then terminated by program step 36.

An extension to the program explained may also involve the "UPnP" logoff messages being evaluated in addition. In principle, it is possible to use the same program, just with test 33 checking whether the parameter NTS is followed by the entry "ssdp:byebye". In this case, a logoff message is involved. When this entry has been identified, the parameter entries are then likewise evaluated again as explained previously. The associated recorded parameters in the internal memory area 23 then need to be erased, so that when the associated device is subsequently decoupled from the network connection switching unit 11 manually, an additional logoff message cannot be generated.

FIG. 5 also shows a flowchart for a program which is executed by the network connection switching unit 11. The program starts in program step 40. However, this program is started only when the network connection switching unit 11 has detected that one of the connected network stations has been decoupled from one of the network connection points. This is identified by the previously explained detection means 26 for the decoupling of network stations and is reported to the microprocessor 22 in the network connection switching unit 11 using an interrupt. The program shown in FIG. 5 thus corresponds to an interrupt service routine for the interrupt triggered in this manner.

In program step 41, the microprocessor 22 reads the entry in the special register 24. In this special register, the setting of a bit indicates that of the four network connection points 25 at which the detected decoupling arose. Next, program step 42 reads the recorded parameter values for the network station connected via the decoupled network connection point 25. In program step 43, the multicast IP address and the number of the network connection point 25 (Port Number) are also read. In program step 44, the proper logoff message for the decoupled network station is then generated. The parameter values and other statements required for this purpose were read in program steps 42 to 43. The finished logoff message has the format as explained in the example indicated above. At program step 45, the previously set entry in the special register 24 is then also erased again. Likewise, the associated entries for the network station which has logged off are also removed from the memory area 23 here, as in the case of regular logoff. The interrupt service routine is terminated by program step 46. The network connection switching unit 11 has thus been updated and has been put back into the initial state for further monitoring operations.

The invention claimed is:

1. A network connection switching unit having one or several network connection points for a network operating on the basis of the Universal Plug and Play system, comprising:
   switching means configured to set up physical connections between the network connection points intermittently or with periodic recurrence,
   evaluation means for evaluating logon and logoff messages from the network stations connected via the network connection points,
   recording means for recording the logged-on network stations,
   detection means for detecting a physical coupling or decoupling event directly responsive to the opening or closing of a connector contact of one of the network stations at a network connection point, and
   logoff message generation means which simulates a logoff message from the network station for which the detection means have detected a physical decoupling event.

2. Network connection switching unit according to claim 1, wherein the logoff message generation means generate the logoff message by accessing the recording means in order to ascertain the correct address information for the logoff message.

3. Network connection switching unit according to claim 1, wherein the logoff message generation means periodically repeat the sending of the logoff message or use inclusive addressing to send it to a plurality of or all network stations simultaneously in order to send the logoff message via a plurality of or all network connection points.

4. Network connection switching unit according to claim 1, wherein the logoff message generation means are designed on the basis of the "Simple Service Discovery Protocol" and generate the logoff message as a "ssdp:byebye message".

5. Network connection switching unit according to claim 1, wherein the detection means for identifying the break in a connection at a network connection point are connected to a register in the recording means.

* * * * *